3,023,205
PROCESS FOR THE PREPARATION OF
DIGLYCOSYLUREAS
Paul R. Steyermark, Takoma Park, Md., and Melville L. Wolfrom, Columbus, Ohio, assignors to W. R. Grace & Co., New York, N.Y., a corporation of Connecticut
No Drawing. Filed Jan. 27, 1960, Ser. No. 4,873
17 Claims. (Cl. 260—211.5)

This invention relates to a process for the preparation of diglycosylureas or more properly 1,3-diglycosylureas. More particularly, the invention relates to a process for the preparation of 1,3-diglycosylureas by the reaction of at least two moles of an aldose with one mole of urea in the presence of a suitable catalyst and in a lower aliphatic acid reaction medium.

Diglucosylurea, one of the members of this class of compounds, is of interest in several fields. The most promising use for this compound is in the preparation of long chain diglucosylurea esters suitable for use in detergent formulations. These esters are prepared by an alcoholysis reaction between a diglucosylurea and an ester of a fatty acid of the general formula

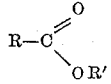

where R is an alkyl, alkenyl or alkadienyl radical having from 7 to 23 carbon atoms and R' is a lower alkyl radical up to and including hexyl. Generically the compounds are described as mono fatty acid esters of diglucosylureas. Typical examples of such esters include the laurate, stearate, oleate, palmitate, etc. Diglucosylurea compounds have also been disclosed as useful supplements in compositions for feeding cattle.

We have discovered that the reaction of two moles of an aldose with one mole of urea in a lower aliphatic acid medium at a temperature between about 75° C. and the boiling point of the reaction mixture gives an improved yield of diglycosylureas if certain catalysts are present. The reaction is illustrated, for example, by the reaction of glucose and urea according to the equation:

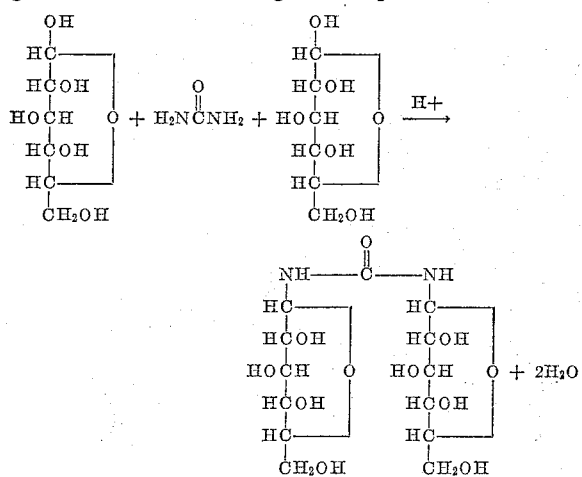

In the operation of the processes of our invention the aldose and urea are dissolved in the organic acid and heated to about 75° C. for a period of time sufficient to dissolve the reactants and for the product diglycosylureas to precipitate. The product is separated using the conventional technique and is purified by successive recrystallizations from water and methanol.

The reaction of the aldose with urea in a non-aqueous medium is more satisfactory than reaction in water in that in the non-aqueous medium there is less hydrolysis and the tendency toward degradation of the products or reactants is much less marked. The reaction is reversible and control of reaction conditions is greatly simplified where the reaction is carried out in a lower organic acid medium.

The choice of the reaction medium should be made on the basis of the properties of the aldose chosen. The reaction will proceed satisfactorily in the presence of any lower aliphatic acid such as, for example, acetic, propionic, butyric, etc. Because of the properties and availability, glacial acetic acid is the preferred medium for the reaction. The diglycosylureas can be prepared by the reaction of urea with any aldose such as, for example, glucose, mannose, galactose, rhamnose, arabinose, xylose, etc. The diglucosylureas are at the present time of the most commercial interest, so that D-glucose is the preferred aldose for the reaction of our invention. The aldose selected is reacted with commercially available urea.

We have found that the yield of the product is greatly improved when the reaction is carried out in the presence of satisfactory catalysts. Any Lewis acid which will catalyze Friedel Crafts type reactions will catalyze the reaction of the aldose with the ureas. Thus, suitable catalysts include beryllium chloride, gallium chloride, thallium chloride, cerium chloride, titanium chloride, zirconium chloride, tin chloride, antimony chloride, bismuth chloride, molybdenum chloride, tungsten chloride, iron chloride, aluminum chloride, boron trifluoride, boron trichloride, and zinc chloride. Of the members of this group, the preferred catalysts are aluminum chloride, zinc chloride and boron trifluoride. The reaction is also catalyzed by gaseous sulfur dioxide. Phosphomolybdic and phosphotungstic acids also exhibit some catalytic activity for the reaction.

It is absolutely necessary to carry out the reaction at an increased temperature because of the solubility problems of these compounds in the acid medium. The aldoses alone are quite insoluble in the acids; however, a mixture of glucose and urea, for example, dissolves in acetic acid at a temperature in the order of 85° C. In the process of our invention, the aldose and urea are heated to a temperature of about 50 to 125° C. depending on the aldose and the reaction medium, the preferred temperature in most cases being in the range of 80 to 95° C.

The reaction time is crucial in that the materials must be heated together for a period long enough to dissolve the components and give the product an opportunity to form and crystallize from the solution. Thus, a satisfactory yield can be obtained in a reaction time of 1 to 24 hours, the preferred time being 6 to 8 hours.

For reasons of economy and ease of operation, we prefer to carry out the reaction at atmospheric pressure. However, the reaction can be run at pressure slightly under atmospheric to about 2 to 3 atmospheres.

To obtain a suitable yield of the product, the reactants must be present in at least a stoichiometric ratio, that is, two moles of aldose to one mol of urea. Because the reaction is reversible, the yield is improved if more than the number of moles required by the stoichiometry of the reaction are present in the reaction mixture. An excess of about 5 to 100 mole percent of the aldose gives satisfactory results. An excess of 10 to 15 mole percent is preferred.

The acid reaction medium must be present in sufficient quantity to enable the mixture to be stirred without undue difficulty. Thus, it is preferred to have a weight of low boiling aliphatic acid equal to the weight of the glucose present in the reaction mixture. However, satisfactory results can be obtained when a quantity equal to approximately 10% of the weight of the glucose is present and good results are obtained when the quantity of acid present is equal to ten times the weight of the glucose. The amount of catalyst to be used depends, of course, on the type of catalyst and the aldose used in preparing the product. Thus, although zinc chloride and aluminum chloride are both Friedel Crafts catalysts, the amount of catalyst used is greatly different. The reaction is catalyzed by a small amount of aluminum chloride, but a much larger amount of zinc chloride is needed to produce the same catalytic effect. When the reaction is catalyzed with sulfur dioxide, the catalyst is added by merely bubbling $SO_2$ through the solution during the period of time the reaction is going on.

The crude product precipitates during the reaction and is separted by crystallization from the mixture on standing at room temperature or by cooling the reaction mixture. Isolation of the product diglycosylureas from the reaction mixture is accomplished by the standard methods well known to those versed in organic chemistry. Often the reaction mixture is first diluted with a quantity of the reaction medium in which case the remainder of the product will be separated directly from the reaction mixture on cooling. Separation may be promoted by the addition of a diluent such as an alcohol to promote crystallization and decrease the solubility of the product in the reaction mixture. The crude product is purified by recrystallization from aqueous methanol.

The purity of these compounds can be readily determined by their optical properties. Thus, the product of the condensation of α-D-glucose with urea either in an aqueous acid medium or in an organic acid medium, for example, is principally 1,3-bis-(β-D-glucopyranosyl)-urea. However, the other two isomers, namely 1,3-bis-(α-D-glucopyranosyl)-urea and 1-(α-D-glucopyranosyl)-3(β-D-glucopyranosyl)-urea, can be expected to be produced simultaneously and may be present in the crude mixture along with any unreacted glucose. All of these compounds by virtue of their asymmetric carbon atoms are optically active, that is, their aqueous solutions rotate the plane of polarized light. D-glucose is dextrorotary and its specific optical rotation at equilibrium is approximately $[\alpha]_D^{25} = +52.5°$. On the other hand, 1,3-bis-(β-D-glucopyranosyl)-urea is levorotary and its specific rotation is $[\alpha]_D^{25} = -40.8°$. The α,α-isomer of 1,3-diglucopyranosylurea can be expected to be dextrorotary while the α,β-isomer should be less dextrorotary than the α,α-isomer and more dextrorotary than the β,β-isomer. The effect of optically inactive contaminants will be to decrease the specific optical rotation of diglucosylurea. The presence of dextrorotary contaminants will decrease the negative optical rotation of diglucosylurea considerably more. Purity determinations based on the optical rotation of the diglucosylurea product provide a much more convenient method of determining its purity than, for instance, determination of the melting point. Diglucosylurea, for example, has no sharp melting point and decomposes gradually above 300° C.

The specific optical rotation of these compounds was used to determine the purity of the compounds as shown in the examples below. Any of the commercially available polarimeters can be used in making this determination.

The scope and utility of our invention is further illustrated by the following specific but non-limiting examples.

Example I

A charge of 150 grams (0.83 mole) of anhydrous α-D-glucose was placed in a three-necked flask equipped with a stirrer, a thermometer and a reflux condenser protected with a drying tube filled with calcium chloride. A total of 25 grams (0.417 mole) of urea and 140 ml. of glacial acetic acid were added and the mixture heated for 8 hours at 90 to 95° C. with constant stirring. The glucose and urea dissolved after about 2½ hours stirring at this temperature. At the end of the 8 hour period, the mixture was diluted with 200 ml. of methanol and cooled to 5° C. for a period of about 20 hours. The crude product 1,3-bis-(D-glucopyranosyl)-urea was recovered by centrifuging and was recrystallized from a mixture of water and methanol. The recrystallized product was filtered and dried at 80 to 120° C. in a vacuum oven to constant weight. The weight of the product was 55 grams which represented a yield of 33.3% theoretical. The purity of the compound was determined by its optical rotation which, in this case, was $[\alpha]_D^{24} = -34.3°$.

It is apparent from the data presented above that a satisfactory yield can be obtained when the reaction is carried out in a glacial acetic acid medium without a catalyst.

Example II

The effectiveness of a zinc chloride catalyst was demonstrated by a run in which the reaction was carried out in the presence of acetic acid and zinc chloride.

In this run a mixture of 75 grams (0.416 mole) of α-D-glucose, 12.5 grams (0.208 mole) of urea, 2.5 grams of freshly fused zinc chloride and 70 ml. of glacial acetic acid were added to a three-neck flask equipped with a stirrer, a thermometer and a reflux condenser protected with a drying tube. The mixture was heated to 95° C. with stirring and this temperature was maintained for a period of 7 hours. The reaction mixture was allowed to cool to room temperature and diluted with 100 ml. of absolute methanol. The mixture was then further cooled to 5° C. and maintained at that temperature for a period of 20 hours. The product was centrifuged and the supernatant liquid was decanted. The residue was recrystallized by dissolving it in about 30 ml. of hot water and reprecipitating from the hot solution with 300 ml. of methanol. A total of 29.5 grams of 1,3-bis-(D-glucopyranosyl)-urea was recovered which represents a yield of 37% theoretical. The purity was determined by optical rotation which, in this case, was $[\alpha]_D^{24} = -35.2°$.

Inasmuch as the purity of the compound is greater where the negative value for optical rotation is higher, it is apparent that an improved yield of a product of higher purity results when the reaction is carried out in the presence of glacial acetic acid as the reactant medium and zinc chloride as a catalyst.

Example III

The effectiveness of aluminum chloride as a catalyst for the reaction was demonstrated in a run in which glucose and urea were reacted in an acetic acid medium in the presence of aluminum chloride.

In this run a charge of 150 grams (0.833 mole) of glucose, 25 grams (0.417 mole) of urea and 238 mg. of anhydrous aluminum chloride were added to a three-necked flask equipped with a stirrer, a thermometer and a reflux condenser protected with a drying tube, along with 140 ml. of glacial acetic acid. The mixture was heated to 90 to 95° C. for a period of 8 hours at which time it was cooled to room temperature, diluted with 100 ml. of absolute methanol, cooled to 5° C. and maintained at that temperature for a period of 20 hours. At the end of that time the material was centrifuged, the supernatant liquid decanted and the residue recrystallized by dissolving it in about 30 ml. of hot water and precipitating the product from the hot solution with 300 ml. of methanol. The yield of the product 1,3-bis-(D-glucopyranosyl)-urea was 67.5 grams or 42% theoretical. The product had a specific optical rotation of $[\alpha]_D^{23} = -32.9°$.

It is apparent from the data presented in this example that aluminum chloride is a good catalyst for the reaction of glucose and urea in the presence of glacial acetic acid.

Example IV

The effectiveness of boron trifluoride as a catalyst is demonstrated in a reaction in which glucose and urea were reacted in glacial acetic acid in the presence of boron trifluoride etherate.

In this run a mixture of 150 grams (0.833 mole) of α-D-glucose, 25 grams (0.417 mole) of urea, 5 ml. of a 4% boron trifluoride etherate solution in acetic acid and 140 ml. of acetic acid were placed in a three-necked flask equipped with a stirrer, a thermometer and a reflux condenser protected with a drying tube. The solution was heated to 90 to 95° C. and maintained at that temperature for a period of 8 hours. At the end of that time the solution was cooled to room temperature, diluted with 100 ml. of absolute methanol, cooled to 5° C. and maintained at that temperature for about 20 hours. The crude product was centrifuged and the supernatant liquid was decanted. The residue was recrystallized by dissolving it in about 30 ml. of hot water and precipitating it from the hot solution with 300 ml. of methanol. The yield of 1,3-bis-(D-glucopyranosyl)-urea was 60 grams corresponding to 37.3% of theoretical. The specific optical rotation of the product was $[\alpha]_D^{23} = -35.4°$.

It is apparent from the data presented above that boron trifluoride etherate catalyzes the reaction of glucose and urea in the presence of glacial acetic acid.

*Example V*

A mixture of 24 grams (0.133 mole) of α-D-glucose and 4 grams (0.0667 mole) of urea and 22 ml. of acetic acid was placed in a small resin kettle and heated to 90 to 95° C. for 5 hours. The kettle was equipped with a gas bubbling apparatus and sulfur dioxide was bubbled through the reaction mixture while it was being heated. A true solution formed after 1½ hours and the product diglucosylurea began to precipitate 2½ hours after the start of the run. At the end of the 5 hour period the slurry was diluted with 33 ml. of methanol and kept at 40° C. for 20 hours. The crude product was removed by filtration, washed with methanol and acetone and dried in vacuo for several hours at 80 to 90° C. The yield of the crude product was 11.6 grams or 45.4% of theoretical. The material was recrystallized from a water methanol solution and 9 grams or a 35% yield of diglucosylurea product having specific optical rotation of $[\alpha]_D^{25} = -35.9°$ was recovered.

It is apparent from the data presented above that sulfur dioxide is an effective catalyst for the reaction of glucose and urea in a glacial acetic acid medium.

*Example VI*

The effect of having a large excess of glucose present in the reaction mixture was demonstrated in a run in which the reaction was carried out in a glacial acetic acid medium and sulfur dioxide was bubbled through the reaction medium.

In this run a suspension of 25 grams (0.417 mole) of urea and 225 grams (1.25 moles) of α-D-glucose, or a 50% excess, in 180 ml. of glacial acetic acid was heated to 90 to 95° C. in a three-necked flask equipped with a stirrer and a thermometer. The reaction vessel was equipped with a bubbling device and a slow stream of sulfur dioxide was bubbled through the mixture during the period of time which the reaction was carried out. The heating in the presence of sulfur dioxide was continued for a period of 8 hours, at which time the mixture was diluted with 250 ml. of methanol and cooled to 4° C. for a period of 20 hours. The crude product was filtered from the cold solution, washed with methanol and acetone and dried in the oven in vacuo. The weight of the product was 95 grams which corresponds to a yield of 59.2%. The specific optical rotation of the product was $[\alpha]_D^{24} = -35.5°$.

It is apparent from the data presented above that the reaction of glucose and urea is catalyzed by the presence of sulfur dioxide and that a large excess of glucose in the reaction mixture does not interfere with the reaction or the purification step.

*Example VII*

The effect of an excess of glucose in the reaction mixture was demonstrated in a run in which the glucose was present only in a 10% excess.

In this run a suspension of 25 grams (0.417 mole) of urea and 165 grams (0.92 mole) of α-D-glucose, representing a 10% molar excess, in 140 ml. of glacial acetic acid, was heated to 90 to 95° C. in a three-necked flask. The flask was equipped with a gas dispersion apparatus and sulfur dioxide was slowly bubbled through the mixture during the 7 hour reaction period. At the end of the 7 hour period, the mixture was diluted with 200 ml. of methanol and cooled to 4° C. for a period of 20 hours. The solids that had separated from the solution were removed by filtration. This crude product was washed with methanol and acetone and oven-dried in vacuo. The product was recrystallized from water and methanol. A total of 82 grams of 1,3-bis-(D-glucopyranosyl)-urea was obtained which corresponds to a yield of 51.2%. The specific optical rotation of the compound was $[\alpha]_D^{23} = -36.5°$.

This example illustrates that a good yield of the product is recovered when the molar excess of glucose is reduced from 50 to 10%.

A comparison of the data collected in Examples V, VI, and VII clearly shows that the reaction is reversible and that the presence of an excess of glucose shifts the equilibrium of the reaction to the right, resulting in an improved yield. Thus, the yield of purified product increased from 35 to 59% when a 50% excess of glucose was present in the reaction mixture. The specific optical rotation of the product obtained when a 50% excess of glucose was present in the reaction mixture indicates that the product probably contained a very small amount of glucose as a contaminant. When the excess of glucose present was reduced to 10%, the specific optical rotation of the purified product indicated that an improved product was recovered from the reaction.

*Example VIII*

A detergent composition was prepared using the diglucosylurea intermediate of this invention by esterifying this compound to form the diglucosylurea laurate and compounding the resultant product. The composition was prepared by forming a 60% solids slurry containing about 40% sodium tripolyphosphate, about 10% tetrasodium pyrophosphate, about 10% sodium metasilicate pentahydrate, about 19.5% sodium sulfate, about 20% diglucosylurea laurate and about 0.5% sodium carboxymethylcellulose. This slurry was vigorously agitated at about 140° F. to form a homogeneous mixture. It was then dried in heated air at a temperature of about 350° F. with a resultant moisture loss of about 40%. The resulting composition was recovered as a powder which possessed a high grade of detersive and foaming properties in both hard and soft water. The resulting detergent was shown to be very effective for heavy duty cleaning purposes in tests of the cleaning properties of the detergent using soiled cotton.

This example illustrates one of the uses of the compounds of this invention, that is, the use of the compound as an intermediate in the preparation of detergent formulations.

Obviously many modifications and variations of the invention as hereinabove set forth may be made without departing from the essence and scope thereof and only such limitations should be applied as are indicated in the appended claims.

What is claimed is:

1. A process for the preparation of diglycosylureas which comprises heating at least 2 moles of an aldose with 1 mole of urea under initially anhydrous conditions in a lower aliphatic acid having 2 to 4 carbon atoms and with a Friedel Crafts catalyst for a period of time sufficient to effect the reaction and recovering the product diglycosylurea.

2. A process for the preparation of diglycosylureas which comprises heating at least 2 moles of an aldose with 1 mole of urea under initially anhydrous conditions in a lower aliphatic acid having 2 to 4 carbon atoms with sulfur dioxide as a catalyst for a period of time sufficient to effect the reaction and recovering the product diglycosylurea.

3. A process for the preparation of diglycosylureas which comprises heating at least 2 moles of an aldose with 1 mole of urea under intially anhydrous conditions in the presence of a quantity of lower aliphatic acid having 2 to 4 carbon atoms equal to the weight of the aldose present and with a Friedel Crafts catalyst for a period of time sufficient to effect the reaction and recovering the product diglycosylurea.

4. A process for the preparation of diglycosylureas which comprises heating at least 2 moles of an aldose with 1 mole of urea under initially anhydrous conditions at a temperature of 50 to 125° C. for a period of 1 to 24 hours in the presence of a quantity of acetic acid equal to the weight of aldose present and with a Friedel Crafts catalyst and recovering the product diglycosylurea.

5. A process for the preparation of diglycosylureas which comprises heating at least 2 moles of an aldose with 1 mole of urea under initially anhydrous conditions at a temperature of 50 to 125° C. for a period of 1 to 24 hours in the presence of a quantity of acetic acid equal to the weight of aldose present while bubbling sulfur dioxide gas through the reaction mixture as a catalyst and recovering the product diglycosylurea.

6. A process for the preparation of diglycosylureas which comprises heating at least 2 moles of an aldose with 1 mole of urea under initially anhydrous conditions in the presence of a quantity of a lower aliphatic reaction medium equal to the weight of glucose present in the presence of a sulfur dioxide catalyst for a period of time sufficient to effect the reaction and recovering the product diglycosylurea.

7. A process for the preparation of 1,3-diglycosylurea which comprises heating at least 2 moles of glucose with 1 mole of urea under initially anhydrous conditions in the presence of a quantity of acetic acid reaction medium equal to about the weight of the glucose present and with a Friedel Crafts catalyst for a period of time sufficient to effect the reaction and recovering the product 1,3-diglucosylurea.

8. A process for the preparation of 1,3-diglucosylurea which comprises heating at least 2 moles of glucose with 1 mole of urea under initially anhydrous conditions in the presence of a quantity of acetic acid reaction medium equal to the weight of glucose present and with a catalytic amount of zinc chloride for a period of time sufficient to effect the reaction and recovering the product 1,3-diglucosylurea.

9. A process for the preparation of 1,3-diglucosylurea which comprises heating at least 2 moles of glucose with 1 mole of urea under initially anhydrous conditions in the presence of a quantity of acetic acid reaction medium equal to the weight of glucose present and a catalytic amount of aluminum chloride for a period of time sufficient to effect a reaction and recovering the product 1,3-diglucosylurea.

10. A process for the preparation of diglucosylurea which comprises heating at least 2 moles of glucose with 1 mole of urea under initially anhydrous conditions in the presence of a quantity of acetic acid reaction medium equal to the weight of glucose present and a catalytic amount of boron trifluoride for a period of time sufficient to effect a reaction and recovering the product 1,3-diglucosylurea.

11. A process for the preparation of 1,3-diglucosylurea which comprises heating at least 2 moles of glucose with 1 mole of urea under initially anhydrous conditions in the presence of a quantity of acetic acid reaction medium equal to the weight of glucose present while bubbling sulfur dioxide gas through the reaction mixture as a catalyst for a period of time sufficient to effect a reaction and recovering the product 1,3-diglucosylurea.

12. A process for the preparation of 1,3-diglucosylurea which comprises heating at least 2 moles of glucose with 1 mole of urea under initially anhydrous conditions at a temperature of 50 to 125° C. for a period of 1 to 24 hours in the presence of a quantity of acetic acid equal to the weight of glucose present in the presence of a Friedel Crafts catalyst and recovering the product 1,3-diglucosylurea.

13. A process for the preparation of 1,3-diglucosylurea which comprises heating 2 to 4 moles of glucose with 1 mole of urea at a temperature of 80 to 95° C. for a period of 6 to 8 hours in the presence of a quantity of acetic acid equal to the weight of glucose present and with a Friedel Crafts catalyst, cooling the reaction mixture to a temperature below 15° C., separating the crude 1,3-diglucosylurea and purifying said product by recrystallization from an aqueous methanol solution.

14. A process for the preparation of 1,3-diglucosylurea which comprises heating 2 to 4 moles of glucose with 1 mole of urea at a temperature of 80 to 95° C. for a period of 6 to 8 hours in the presence of a quantity of acetic acid equal to the weight of glucose present and with a catalytic amount of aluminum chloride, cooling the reaction mixture to a temperature below 15° C., separating the crude 1,3-diglucosylurea and purifying said product by recrystallization from an aqueous methanol solution.

15. A process for the preparation of 1,3-diglucosylurea which comprises heating 2 to 4 moles of glucose with 1 mole of urea at a temperature of 80 to 95° C. for a period of 6 to 8 hours in the presence of a quantity of acetic acid equal to the weight of glucose present and with a catalytic amount of zinc chloride, cooling the reaction mixture to a temperature below 15° C., separating the crude 1,3-diglucosylurea and purifying said product by recrystallization from an aqueous methanol solution.

16. A process for the preparation of 1,3-diglucosylurea which comprises heating 2 to 4 moles of glucose with 1 mole of urea at a temperature of 80 to 95° C. for a period of 6 to 8 hours in the presence of a quantity of acetic acid equal to the weight of glucose present, and with a catalytic amount of boron trifluoride etherate, cooling the reaction mixture to a temperature below 15° C., separating the crude 1,3-diglucosylurea and purifying said product by recrystallization from an aqueous methanol solution.

17. A process for the preparation of 1,3-diglucosylurea which comprises heating 2 to 4 moles of glucose with 1 mole of urea at a temperature of 80 to 95° C. for a period of 6 to 8 hours in the presence of a quantity of acetic acid equal to the weight of glucose present while bubbling gaseous sulfur dioxide through the mixture as a catalyst, cooling the reaction mixture to a temperature below 15° C., separating the crude 1,3-diglucosylurea and purifying said product by recrystallization from an aqueous methanol solution.

No references cited.